United States Patent [19]
Wittman

[11] Patent Number: 5,694,460
[45] Date of Patent: Dec. 2, 1997

[54] CIRCUIT AND METHOD FOR REDUCING COMMON MODE INTERFERENCE IN TELEPHONE INSTRUMENTS

[75] Inventor: Brian Albert Wittman, Indianapolis, Ind.

[73] Assignee: Lucent Technologies Inc., Murray Hill, N.J.

[21] Appl. No.: 597,756

[22] Filed: Feb. 7, 1996

[51] Int. Cl.$^6$ .............................. H04M 1/60; H04M 9/00; H04M 7/04; H04M 1/76
[52] U.S. Cl. .................. 379/156; 379/398; 379/416
[58] Field of Search .................. 379/156, 159, 379/160, 161, 162, 163, 164, 165, 166, 398, 399, 394, 400, 402, 103, 414, 418, 415, 416; 327/325

[56] References Cited

U.S. PATENT DOCUMENTS

| | | | |
|---|---|---|---|
| 4,570,034 | 2/1986 | Serrano | 379/418 |
| 4,803,718 | 2/1989 | Neil et al. | 379/163 |
| 5,274,702 | 12/1993 | Rosch et al. | 379/399 |

*Primary Examiner*—Curtis Kuntz
*Assistant Examiner*—Paul Loomis

[57] ABSTRACT

A circuit for, and method of, reducing cross-coupled interference between first and second telephone lines of a multi-line telephone instrument and a telephone instrument containing the same. The circuit includes: (1) a first differential input amplifier having first tip and ring inputs coupled to conductors of the first telephone line and first tip and ring shunt resistors coupling the first tip and ring inputs to a signal reference of the telephone instrument and (2) a second differential input amplifier having second tip and ring inputs coupled to conductors of the second telephone line and second tip and ring shunt resistors coupling the second tip and ring inputs to the signal reference, the first and second tip and ring shunt resistors decreasing a common mode input resistance of the first and second differential input amplifiers, thereby attenuating cross-coupled interference common to both of the first and second telephone lines. The circuit and method may further be suitably employed to reduce the effects of common mode interference in other telephone instruments, including, but not limited to, single-line telephone instruments.

22 Claims, 6 Drawing Sheets

1

CIRCUIT AND METHOD FOR REDUCING COMMON MODE INTERFERENCE IN TELEPHONE INSTRUMENTS

TECHNICAL FIELD OF THE INVENTION

The present invention is directed, in general, to reducing common mode interference in telephone instruments and, more specifically, to a circuit and method for decreasing common mode interference between telephone lines in multi-line telephone instruments.

BACKGROUND OF THE INVENTION

The cost of telephone service has decreased to the level that many homes and small offices are now serviced by multiple telephone lines, thus providing greater convenience to telephone service customers. To accommodate multiple-line service, telephone instrument manufacturers have designed telephone instruments having the capability to receive inputs from multiple telephone lines. However, several related problems associated with the design of current telephone service equipment and the geographically-dispersed nature of the total system have impeded the ability of multi-line telephone instruments to function reliably when connected to multiple telephone lines.

Because a multi-line telephone instrument must contain appropriate interface circuitry to couple to each telephone service input, the system design must provide adequate isolation between the circuitry servicing each input line so that signals present on a first telephone service input do not adversely affect the operation of multi-line telephone instrument circuitry servicing a second telephone service input. As will be described more fully in the Detailed Description that follows, several causes of instability in multi-line telephone circuitry can be related to either the type of signal being received on a particular telephone service line or the location of the Central Office ("CO") from which that signal is transmitted.

One typical situation is where a first telephone call is received on a first line of a multi-line telephone instrument and a second telephone call is received on a second line of the same multi-line telephone instrument, where both calls are routed through the same CO to the receiving telephone instrument. In the prior art, the presence of a signal exceeding the input voltage range of the input amplifier of the telephone instrument circuitry associated with the first or second line may cause the input amplifier corresponding to that line to clip. As will be described more fully hereinafter, this clipping may interfere with the normal operation of telephone instrument circuitry associated with the other telephone line.

A second situation is where a first telephone call is received on a first line of a multi-line telephone instrument and a second telephone call is received on a second line of the same multi-line telephone instrument, where each line is connected to different CO locations. In this situation, the signals received by the multi-line telephone instrument circuitry associated with the first and second telephone lines are received from CO locations that may have different signal references for the transmitted telephone signals, possibly due to different ground potentials at each CO. As is well known in the art, the ground potential of the earth varies with locality and also as a function of certain phenomena such as meteorological disturbances. As will be described more fully hereinafter, this difference in reference voltages may interfere with the normal operation of multi-line telephone instrument circuitry.

A third situation is where a first telephone call is received on a first line of a multi-line telephone instrument and, while Caller ID circuitry associated with the first line is attempting to decode calling-station identification information carried on the received signal, a second telephone call is received on a second line of the same multi-line telephone instrument. In prior art multi-line telephone instruments, the presence of a large ringing signal associated with the incoming call on the second telephone line may interfere with the ability of Caller ID circuitry associated with the first line to decode calling-station identification information. This is because Caller ID information is transmitted at relative low voltages, and thus any cross-coupling between circuitry associated with the first and second telephone lines caused by the presence of a large ringing signal on a second telephone line may distort the relatively low-voltage Caller ID signal on the first telephone line.

Solutions existing in the prior art to the problems described above have taken several forms. One attempted solution is to provide optical isolation between the first and second telephone line input circuitry in multi-line telephone instruments. In addition to the added complexity and cost of the required circuitry, a disadvantage of this approach is that the optical couplers necessary to provide optical isolation may draw a significant amount of current from the telephone line. This may cause the ringer equivalency number (REN) for the multi-line telephone instrument, or the combination of telephone instruments connected to the same telephone line, to exceed the regulated value. The REN for a telephone instrument indicates the quantity of ringers that may be connected to a single telephone line and still allow all the telephone instruments to ring on an incoming call. The total of all RENs for the telephone instruments connected to one line must not exceed the value 5 or some or all of the fingers may not operate.

To overcome the REN limitation, a second solution existing in the prior art combines the use of optical couplers with a battery or other power source to supply the current requirements of the optical couplers. A disadvantage of this approach, however, is that the telephone instrument must include either user-replaceable batteries or AC power supply circuitry. If the use of batteries is selected, a user must periodically check and replace the batteries, that is costly and inconvenient. The use of AC power supply circuitry requires that the telephone instrument be connected to and located near a source of AC power, and also adds size and cost to the telephone instrument.

Accordingly, what is needed in the art is a circuit and method for decreasing common mode interference in telephone instruments. A further need exists in the art for a simplified circuit and method for decreasing cross-coupled interference between telephone lines in multi-line telephone instruments, wherein the circuit and method does not require the use of optical isolation.

SUMMARY OF THE INVENTION

To address the above-discussed deficiencies of the prior art, the present invention provides a circuit for, and method of; reducing cross-coupled interference between first and second telephone lines of a multi-line telephone instrument and a telephone instrument containing the same.

The circuit includes: (1) a first differential input amplifier having first tip and ring inputs coupled to conductors of the first telephone line and first tip and ring shunt resistors coupling the first tip and ring inputs to a signal reference of the telephone instrument and (2) a second differential input amplifier having second tip and ring inputs coupled to conductors of the second telephone line and second tip and ring shunt resistors coupling the second tip and ring inputs to the signal reference, the first and second tip and ring shunt resistors decreasing a common mode input resistance of the first and second differential input amplifiers, thereby attenuating cross-coupled interference common to both of the first and second telephone lines.

The present invention therefore introduces a low-cost, effective means by which cross-coupled, common mode interference may be reduced. Reduction of such common mode interference increases the reliability of the telephone instrument and improves signal quality for the benefit of the user.

In one embodiment of the present invention, (1) the first tip and ring inputs comprise first tip and ring series resistors for providing resistance between the conductors of the first telephone line and the first differential input amplifier and (2) the second tip and ring inputs comprise second tip and ring series resistors for providing resistance between the conductors of the second telephone line and the second differential input amplifier. The first and second tip and ring series resistors at least partially compensate for a reduction in differential input resistance of the first and second differential input amplifiers caused by the first and second tip and ring shunt resistors. Those of ordinary skill in the art will recognize, however, that the first and second tip and ring series resistors are not necessary to reduce common mode interference.

In one embodiment of the present invention, the circuit further comprises: (1) a first capacitor coupling the first tip and ring inputs to filter signals on the first telephone line having a frequency above a first selected threshold frequency and (2) a second capacitor coupling the second tip and ring inputs to filter signals on the second telephone line having a frequency above a second selected threshold frequency. Although not necessary to the present invention, the first and second capacitors provide a desirable filtering function.

In one embodiment of the present invention, (1) the first differential input amplifier comprises a first operational amplifier having first inverted and non-inverted inputs and an output, a first feedback resistor coupling the first output and the first inverted input and (2) the second differential input amplifier comprises a second operational amplifier having second inverted and non-inverted inputs and an output, a second feedback resistor coupling the second output and the second inverted input. As those of ordinary skill in the art are aware, the first and second feedback resistors provide negative feedback to control the gain of the first and second operational amplifiers, respectively.

In one embodiment of the present invention, (1) the first differential input amplifier comprises a first operational amplifier having first inverted and non-inverted inputs and an output, a resistor coupling the first non-inverted input to the signal reference and (2) the second differential input amplifier comprises a second operational amplifier having second inverted and non-inverted inputs and an output, a resistor coupling the second non-inverted input to the signal reference.

In one embodiment of the present invention, the first lip and ring inputs are coupled to tip and ring conductors of the first telephone line, respectively. It is not always possible to ensure that the polarity with respect to the tip and ring conductors of the first and second telephone lines is correct. The present invention is indifferent to the polarity of the first and second telephone lines and the voltages of the signals thereon.

In one embodiment of the present invention, the signal reference of the telephone instrument differs from first and second signal references associated with the first and second telephone lines, respectively. Although such need not be the case, the present invention is also indifferent as to whether the electrical grounds associated with the first and second telephone lines are the same as the electrical ground associated with the telephone instrument itself. The present invention assumes that the various grounds may float with respect to one another.

The present invention also provides a multi-line telephone instrument. The instrument comprises: (1) a base having a keypad and containing circuitry of the telephone instrument, (2) a handset, coupled to the circuitry, for providing an interface for a user, (3) a network interface for selectively coupling the telephone instrument to one of first and second telephone lines of a telecommunications network and (4) a circuit for reducing cross-coupled interference between the first and second telephone lines, comprising: (4a) a first differential input amplifier having first tip and ring inputs coupled to conductors of the first telephone line and first tip and ring shunt resistors coupling the first tip and ring inputs to a signal reference of the telephone instrument and (4b) a second differential input amplifier having second tip and ring inputs coupled to conductors of the second telephone line and second tip and ring shunt resistors coupling the second tip and ring inputs to the signal reference, the first and second tip and ring shunt resistors decreasing a common mode input resistance of the first and second differential input amplifiers, thereby attenuating cross-coupled interference common to both of the first and second telephone lines and deleterious to an operation of the circuitry of the telephone instrument.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
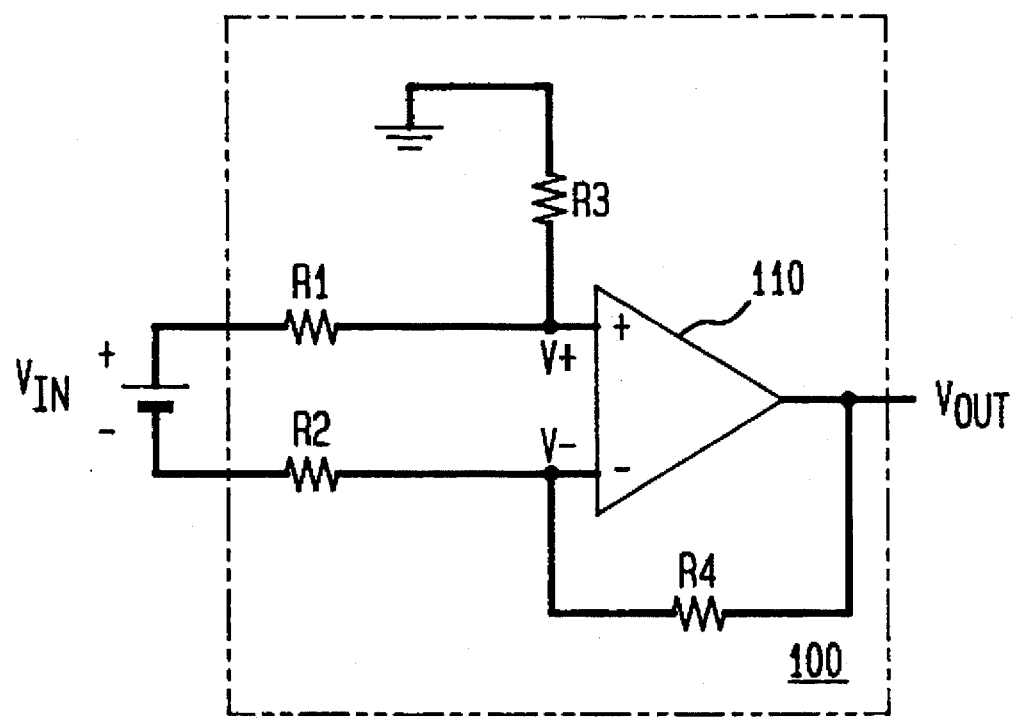
FIG. 1 illustrates a simplified circuit schematic of a differential input stage of a telephone instrument.

Referring initially to FIG. 1, illustrated is a simplified circuit schematic of a differential input stage of a telephone instrument. Those of ordinary skill in the art will recognize the classic topology of amplifier circuit 100 of FIG. 1 and that, for $R_1=R_2$ and $R_3=R_4$, the gain of amplifier circuit 100 is equal to the ratio of $R_3/R_1$, referenced hereinafter as $\beta$. It is also known to those skilled in the art that when operational amplifier 110 of amplifier circuit 100 is operating normally, i.e., is not saturated, the voltages at both input terminals, $V^+$ and $V^-$, are equal. In that case, those of skill in the art will recognize that $V^+=V^-=V_{IN}\beta/2$ for the circuit of FIG. 1, where $V_{IN}$ is the differential input voltage to amplifier circuit 100. This relationship reveals that the input voltages $V^+$ and $V^-$ for operational amplifier 110 are dependent on the differential input signal $V_{IN}$.

Figure 2:
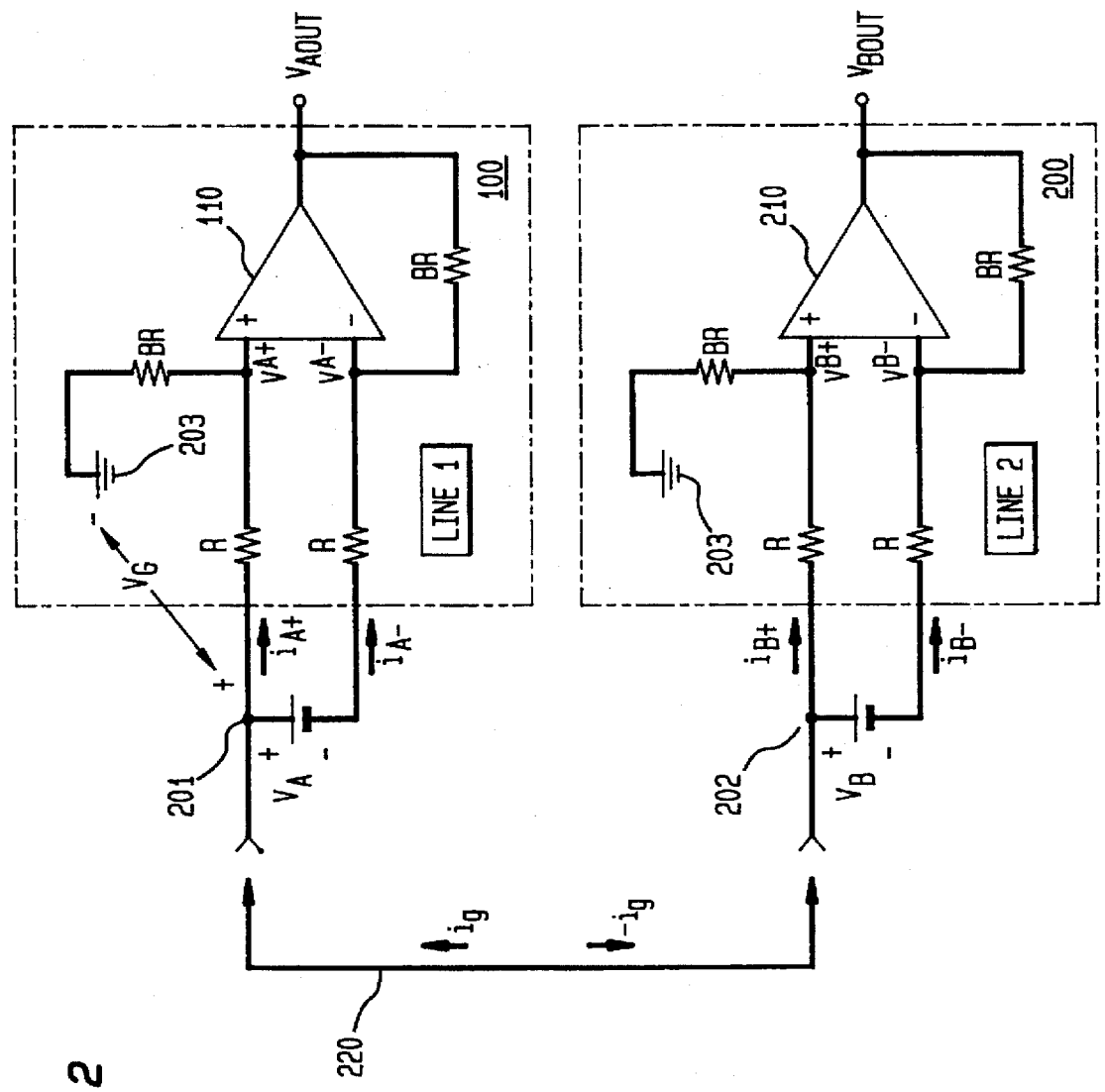
FIG. 2 illustrates a simplified circuit schematic for two differential input stages for a two-line telephone instrument.

Referring next to FIG. 2, illustrated is a simplified circuit schematic for two differential input stages for a two-line telephone instrument. Line 220 in FIG. 2 represents the situation where the telephone signals received by both LINE 1 and LINE 2 are received from the same CO, and thus have the same signal reference. In FIG. 2, amplifier circuit 200 has the same configuration of amplifier circuit 100, that has the same configuration as in FIG. 1 with $R_1=R_2=R$ and $R_3=R_4=\beta R$, from which it can be shown that, as described supra, both amplifier circuits 100 and 200 have a gain of $\beta$ (i.e., $R_3/R_1$). Thus, $V_{Aout}=\beta V_A$, and $V_{Bout}=\beta V_B$.

As noted previously with reference to FIG. 1, when operational amplifier 110 is in normal operation, $V^{A+}$ equals $V^{A-}$. Similarly, when operational amplifier 210 is in normal operation, $V^{B+}$ equals $V^{B-}$. Furthermore, because differential input signals $V_A$ and $V_B$ are referenced to a CO ground and not to local ground, a voltage $V_G$ may be present between node 201 and local ground 203. When a voltage $V_G$ is present between node 201 and local ground 203, a voltage divider relationship exists from which it can be shown that $V^{A+}=V_G\beta R/(R+\beta R)=V_G\beta/(1+\beta)$. Similarly, it can be shown that $V^{B+}=V_G\beta/(1+\beta)$, and thus $V^{A+}$ is equal to $V^{B+}$. Furthermore, as noted previously with reference to FIG. 1, when operational amplifiers 110 and 210 of amplifier circuits 100 and 200 are operating normally, i.e., are not saturated, the voltages at the input terminals of each operational amplifier ($V^{A+}$, $V^{A-}$ and $V^{B+}$, $V^{B-}$, respectively, in FIG. 2) are equal. Therefore, when operational amplifiers 110 and 120 are not saturated, $V^{A+}=V^{A-}=V^{B+}=V^{B-}$. In light of the foregoing relationships, it can be shown that when operational amplifiers 110 and 210 of amplifier circuits 100 and 200 are not saturated, $V^{A+}=V^{A-}=V^{B+}=V^{B-}=(V_A+V_B)\beta/4$.

Thus it can be seen that the inputs $V^{A+}$, $V^{A-}$, $V^{B+}$, and $V^{B-}$ of operational amplifiers 110, 210 are all at the same voltage and that these voltages are a function of the signals ($V_A$, $V_B$) received by BOTH telephone lines servicing the multi-line telephone instrument. Therefore, if operational amplifier 110 is driven into saturation, operational amplifier 120 also saturates, thus illustrating that the presence of a signal on a first telephone input line in a multi-line telephone instrument induces an undesired voltage at the terminals of an operational amplifier in circuitry servicing a second telephone input line.

It is known in the art that the relative polarity of the tip-to-ring voltage of an incoming telephone line is uncertain. It is further known that, as noted supra, separate telephone lines servicing a multi-line telephone instrument may be connected to remote COs having different signal reference voltages. These two facts necessitate slight modifications of the foregoing circuit analysis; however, the modifications required do not change the conclusion that the presence of a signal on a first telephone input line in a multi-line telephone instrument induces an undesired voltage at the terminals of an operational amplifier in circuitry servicing a second telephone input line. Therefore, the present invention is directed to a circuit and method for decreasing cross-coupled interference between telephone lines in multi-line telephone instruments.

Figure 3:
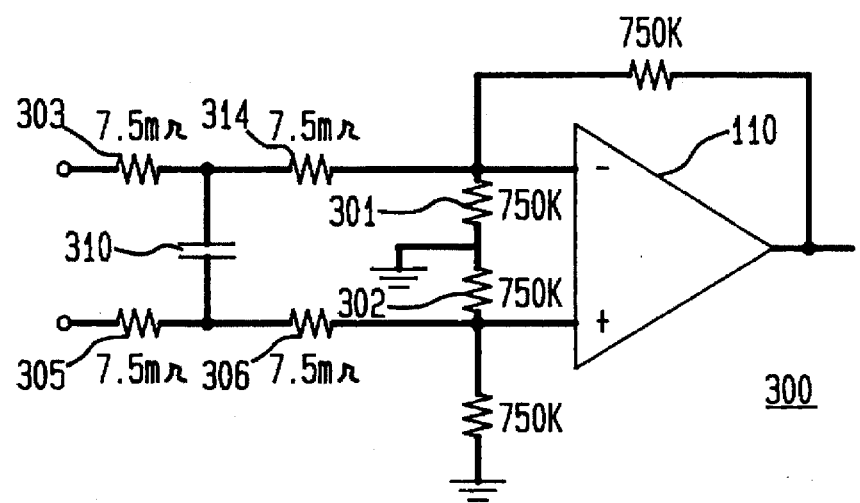
FIG. 3 illustrates a detailed circuit schematic of a differential input stage of a multi-line telephone instrument employing the present invention.

FIG. 3 illustrates a detailed circuit schematic of a dc-coupled differential input stage 300 which may be employed to advantage in a multi-line telephone instrument. Those of skill in the art will recognize that differential input stage 300 may be suitably modified for ac-coupled circuit applications. Input stage 300 is functionally equivalent to the simplified circuits 100 illustrated in FIG. 1 with the exception of the addition of resistors 301, 302, and with the exception that resistors $R_1$ and $R_2$ of the circuit in FIG. 1 have each been split into two component parts, with a capacitor 310 inserted across the line between the component parts. The purpose of the addition of capacitor 310, as those skilled in the art will recognize, is to provide high-frequency noise filtering of the differential input signal. Resistors 301, 302, as hereinafter described, reduce the common mode input resistance of operational amplifier 110, whereby cross-coupled interference between telephone lines is reduced in multi-line telephone instruments.

Recognizing that the inputs $V^{A+}$, $V^{A-}$, $V^{B+}$, and $V^{B-}$ of operational amplifiers 110, 210 of FIG. 2 are all at the same voltage when the amplifiers are not operating in saturation, and that these voltages are a function of the signals received by BOTH telephone lines servicing the multi-line telephone instrument, as described supra, the circuit and method of the present invention employs a means of reducing the common mode signals present at the inputs to each operational amplifier, while minimizing any effect on the differential signals received on each telephone line.

Figure 4:
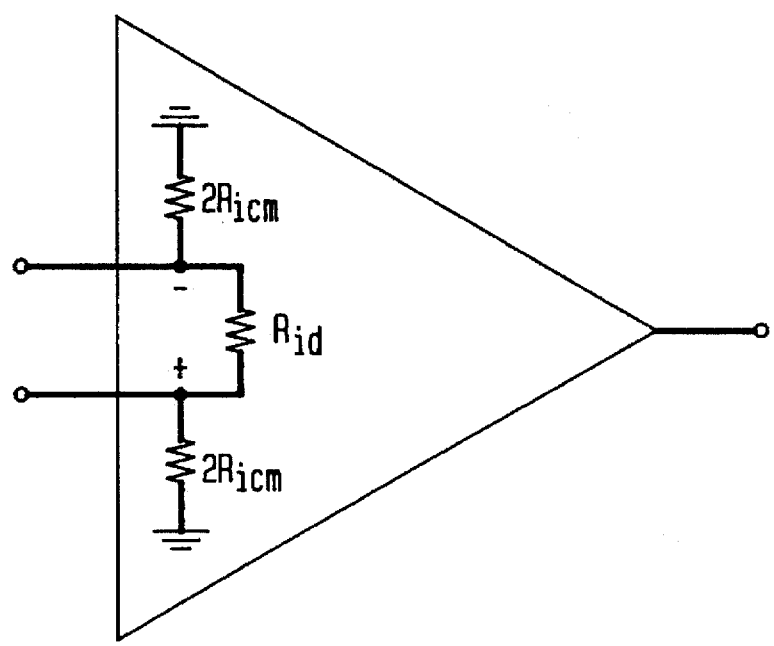
FIG. 4 illustrates the equivalent circuit of an operational amplifier, incorporating its finite differential and common mode input resistances.

An ideal operational amplifier is not supposed to draw any input current - that is, the signal current into the inverting and non-inverting terminals are both zero. In other words, the input impedance of an ideal operational amplifier is supposed to be infinite. However, presently available operational amplifiers are not ideal; they have a differential input resistance ($R_{id}$), that is the resistance as measured between the inverting and non-inverting input terminals, and a common-mode input resistance ($R_{icm}$), that can be measured by tying the inverting and non-inverting input terminals together and measuring the input resistance to ground. FIG. 4 illustrates the equivalent circuit of an operational amplifier, incorporating its finite differential and common mode input resistances, $R_{id}$ and $R_{icm}$, respectively, where $R_{icm}$ is split into two equal parts ($2R_{icm}$), each connected between one of the input terminals and ground. Ideally, the differential and common mode input resistances should be as high as possible to avoid attenuation of the input signal. Typical values for the input resistances of general purpose operational amplifiers are $R_{id}=1M\Omega$ and $R_{icm}=100M\Omega$. The present invention recognizes that, by reducing the common mode input resistance of the operational amplifier, a telephone line input stage amplifier can be designed that provides increased attenuation of unwanted common mode signals.

The common mode input resistance of operational amplifier 110 is reduced by adding resistors 301, 302 between the inverting and non-inverting input terminals and ground. As can be seen with reference to FIG. 4, the addition of resistors 301, 302 effectively adds resistance in parallel with the effective common mode input resistances ($2R_{icm}$) internal to the operational amplifier, thus yielding a common mode input resistance of lower value. An undesired effect of this, however, may be a reduction in the differential input resistance of the operational amplifier. This effect may be offset by increasing the value of series input resistors 303, 304, 305, 306. Component values shown in FIG. 3 have been demonstrated experimentally to provide acceptable circuit operation while decreasing common mode interference between telephone lines in multi-line telephone instruments.

Figure 5A:
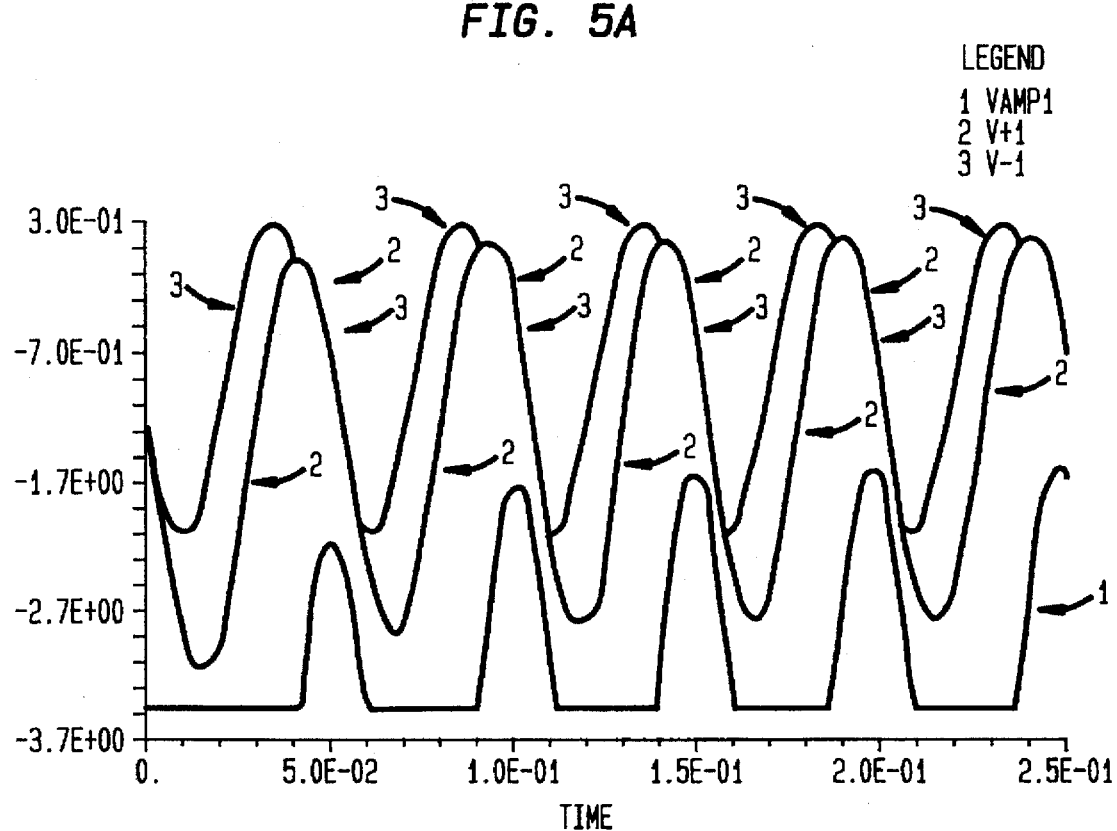
FIG. 5a illustrates a plot of the input and output voltage waveforms for the operational amplifier of a differential input stage for LINE 1 when an abnormally large ringing signal is received on LINE 1 of a two-line telephone instrument employing the present invention.
Figure 5B:
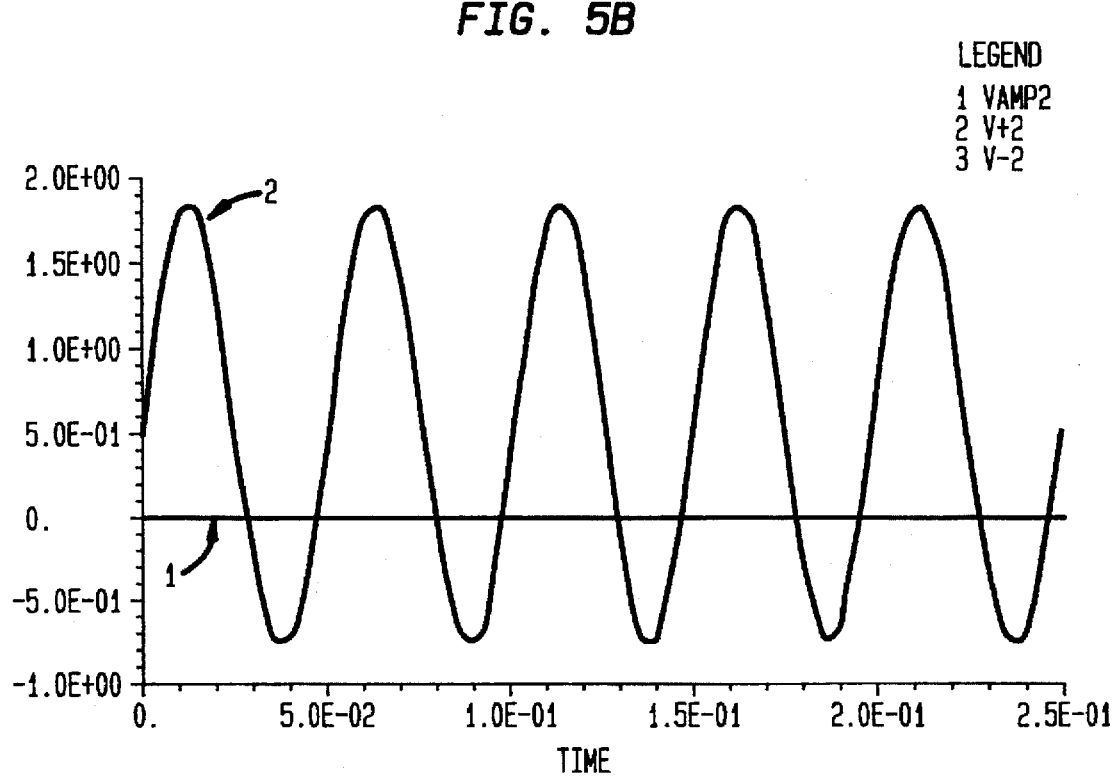
FIG. 5b illustrates a plot of the input and output voltage waveforms for the operational amplifier of the differential input stage for LINE 2 when an abnormally large ringing signal is received on LINE 1 of a two-line telephone instrument employing the present invention.

FIGS. 5a and 5b, in conjunction, illustrate the capability of the present invention to prevent common mode interference between telephone lines in multi-line telephone instruments. FIGS. 5a and 5b are plots of input and output voltage waveforms for first and second differential input stages, constructed as shown in FIG. 3, in a multi-line telephone instrument employing the present invention. These plots represent the situation where LINE 1 of the multi-line phone receives a 212 volt peak (424 volt peak-to-peak) 20 Hz sine wave with a 79 volt DC component, representative of an abnormally large telephone ringing signal.

FIG. 5a illustrates a plot of the input and output voltage waveforms for the operational amplifier of a differential input stage for LINE I when an abnormally large ringing signal is received on LINE 1 of a two-line telephone instrument employing the present invention. In FIG. 5a, plots 2 and 3 represent the voltages present at the input terminals to operational amplifier 110 of LINE 1, and plot 1 represents the voltage output of operational amplifier 110. As can be seen in FIG. 5a, the operational amplifier output voltage is clipped, meaning the amplifier is saturated. This is also reflected by the fact that the operational amplifier inputs are not tracking each other, as shown by the offset of plots 2 and 3.

FIG. 5b illustrates a plot of the input and output voltage waveforms for the operational amplifier of the differential input stage for LINE 2 when an abnormally large ringing signal is received on LINE 1 of a two-line telephone instrument employing the present invention. As FIG. 5b illustrates, even though a high-voltage ringing signal has caused the LINE 1 operational amplifier 110 to periodically saturate (reference FIG. 5a), LINE 2 is unaffected. This is illustrated by the fact that plots 2 and 3, corresponding to the voltages at the input terminals to the operational amplifier for LINE 2, are tracking each other, signifying that the amplifier for LINE 2 does not saturate even though the amplifier for LINE 1 is periodically going into saturation.

Figure 6:
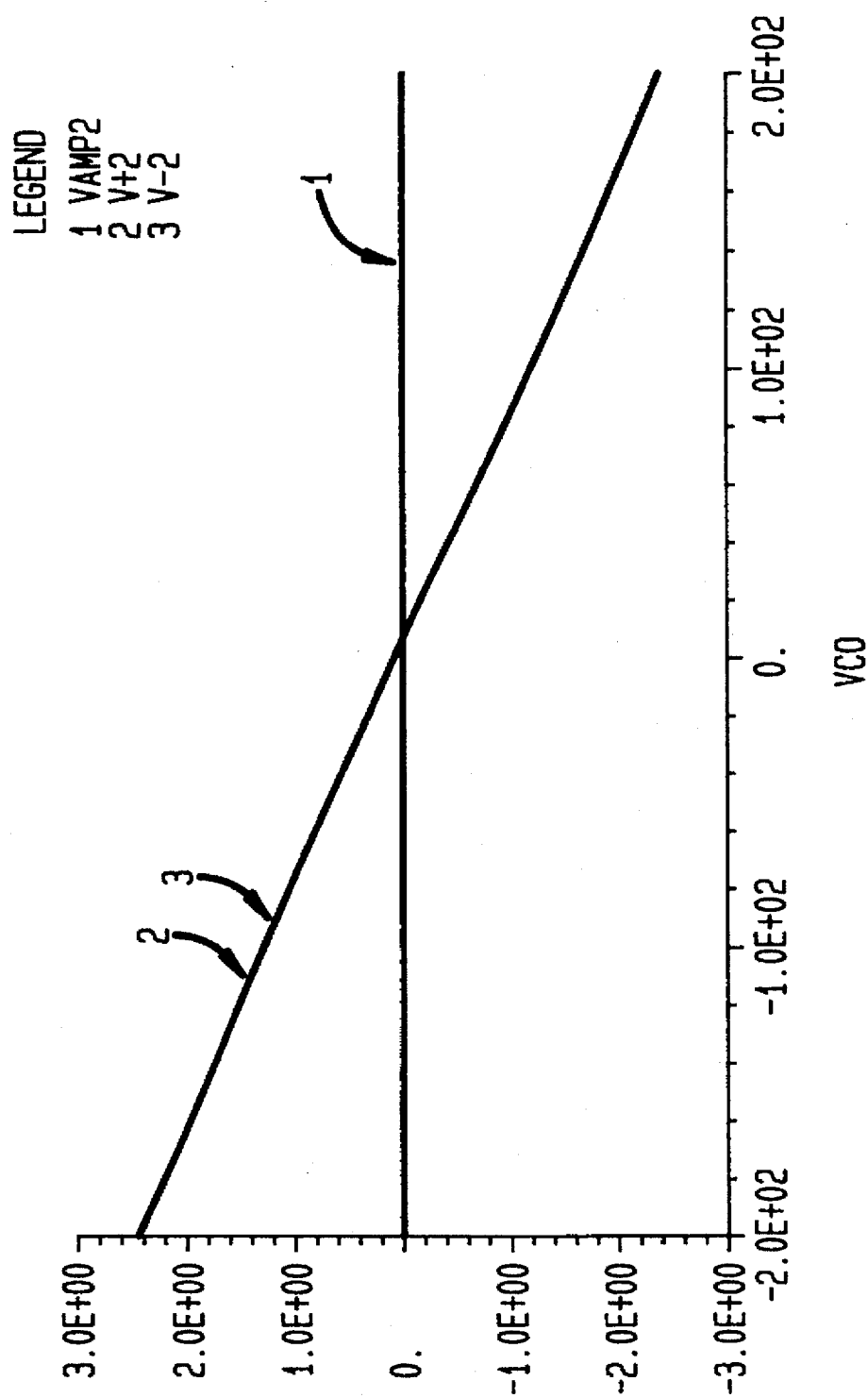
FIG. 6 illustrates the input and output voltage waveforms for the operational amplifier of a differential input stage of LINE 2 when simultaneous calls are connected to LINE 1 and LINE 2 of a two-line telephone instrument employing the present invention, when each call is received from remote COs.

FIG. 6 further illustrates the capability of the present invention to prevent common mode interference between telephone lines in multi-line telephone instruments. FIG. 6 illustrates the input and output voltage waveforms for the operational amplifier of a differential input stage of LINE 2 when simultaneous calls are connected to LINE 1 and LINE 2 of a two-line telephone instrument employing the present invention, when each call is received from remote COs. In FIG. 6, "VCO" represents the difference in magnitude of signal reference potentials for LINE 1 and LINE 2 telephone signals received from different COs. Plots 2 and 3 illustrate the voltages present at the input terminals to the operational amplifier 110 corresponding to LINE 2, while plot 1 illustrates the output voltage of the same amplifier. As can be seen from the plots of FIG. 6, the amplifier input voltages track each other, signifying that the amplifier does not saturate for any value of VCO ranging from −200 volts to +200 volts.

Figure 7:
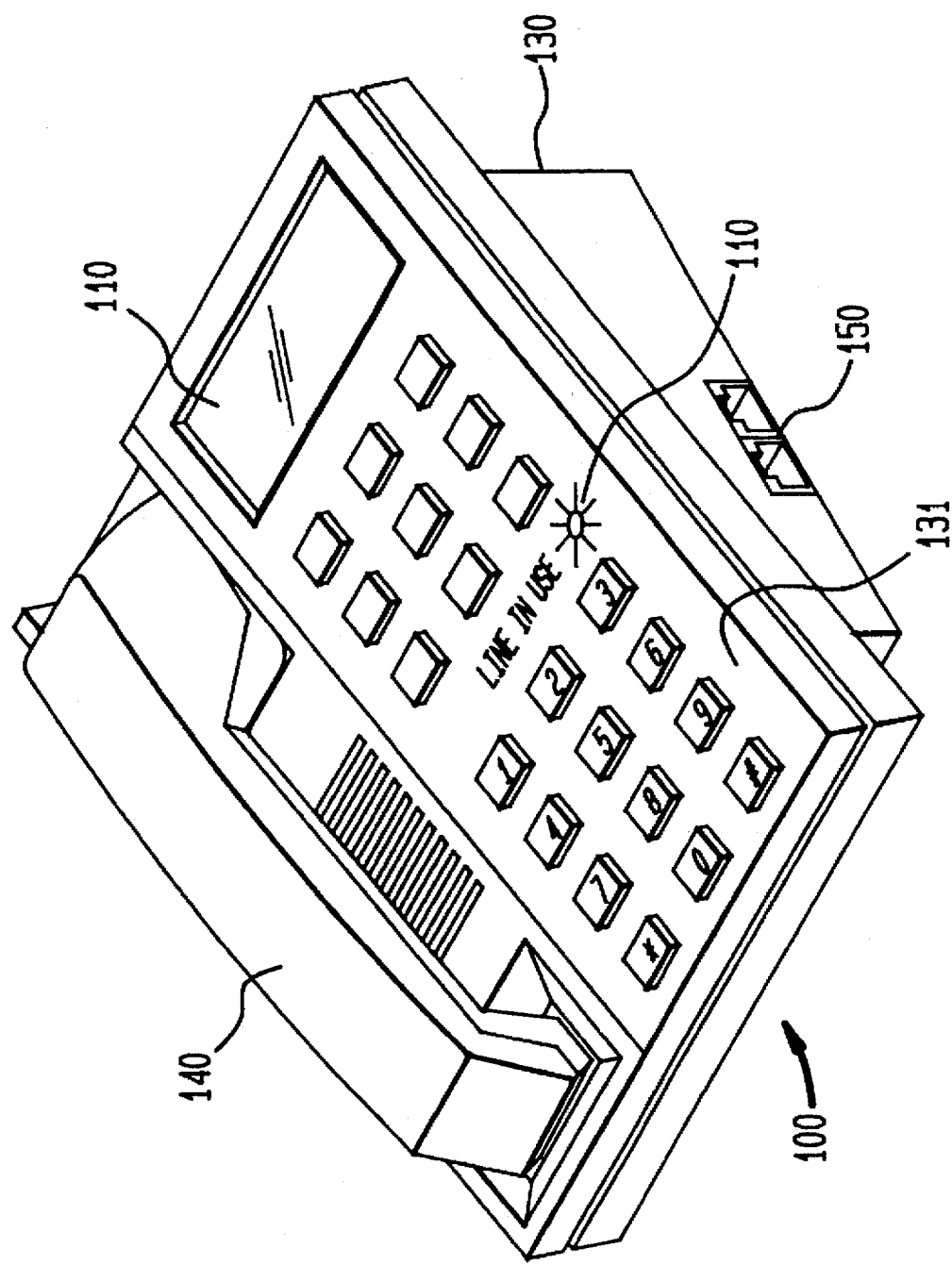
FIG. 7 illustrates a multi-line telephone set suitable to employ the present invention.

FIG. 7 illustrates a multi-line telephone set 100 suitable to employ the present invention. Telephone instrument 100 comprises a base 130 having a keypad 131 and a liquid crystal display ("LCD") 110 operating as a data display. LCD 110 is suitable for providing information to users such as time-of-day, dialed telephone numbers or the telephone number of an incoming call. A handset 140 is coupled to the base and provides an interface to a user for transmission and receipt of speech. A network interface 150 is couplable to multiple lines of a telecommunications network (not shown) via a telephone line (also not shown) comprising tip and ring conductors for each line.

The foregoing has illustrated the advantages of the present invention for reducing cross-coupling of common mode interference between telephone lines in multi-line telephones. Common mode signal interference, however, may also present a problem in single-line telephone instruments. As described hereinabove, the differential input stage 300 illustrated in FIG. 3 is operative to reduce common mode interference on telephone lines. Therefore, the circuit and method of the present invention may be suitably employed to reduce the effects of common mode interference in other telephone instruments, including, but not limited to, single-line telephone instruments.

Although the present invention has been described in detail, those skilled in the art should understand that they can make various changes, substitutions and alterations herein without departing from the spirit and scope of the invention in its broadest form.

What is claimed is:

1. A circuit for reducing cross-coupled interference between first and second telephone lines of a multi-line telephone instrument, comprising:

a first differential input amplifier having first tip and ring inputs coupled to conductors of said first telephone line and first tip and ring shunt resistors coupling said first tip and ring inputs to a signal reference of said telephone instrument; and a second differential input amplifier having second tip and ring inputs coupled to conductors of said second telephone line and second tip and ring shunt resistors coupling said second tip and ring inputs to said signal reference, said first and second tip and ring shunt resistors decreasing a common mode input resistance of said first and second differential input amplifiers thereby attenuating cross-coupled interference common to both of said first and second telephone lines.

2. The circuit as recited in claim 1 wherein:

said first tip and ring inputs comprise first tip and ring series resistors for providing resistance between said conductors of said first telephone line and said first differential input amplifier; and said second tip and ring inputs comprise second tip and ring series resistors for providing resistance between said conductors of said second telephone line and said second differential input amplifier, said first and second tip and ring series resistors at least partially compensating for a reduction in differential input resistance of said first and second differential input amplifiers caused by said first and second tip and ring shunt resistors.

3. The circuit as recited in claim 1 further comprising:

a first capacitor coupling said first tip and ring inputs to filter signals on said first telephone line having a frequency above a first selected threshold frequency; and a second capacitor coupling said second tip and ring inputs to filter signals on said second telephone line having a frequency above a second selected threshold frequency.

4. The circuit as recited in claim 1 wherein:

said first differential input amplifier comprises a first operational amplifier having first inverted and non-inverted inputs and an output, a first feedback resistor coupling said first output and said first inverted input; and said second differential input amplifier comprises a second operational amplifier having second inverted and non-inverted inputs and an output, a second feedback resistor coupling said second output and said second inverted input.

5. The circuit as recited in claim 4 wherein:

said first differential input amplifier comprises a first operational amplifier having first inverted and non-inverted inputs and an output, a resistor coupling said first non-inverted input to said signal reference; and said second differential input amplifier comprises a second operational amplifier having second inverted and non-inverted inputs and an output, a resistor coupling said second non-inverted input to said signal reference.

6. The circuit as recited in claim 1 wherein said first tip and ring inputs are coupled to tip and ring conductors of said first telephone line, respectively.

7. The circuit as recited in claim 1 wherein said signal reference of said telephone instrument differs from first and second signal references associated with said first and second telephone lines, respectively.

8. The circuit as recited in claim 1 wherein said signal reference of said telephone instrument is the electrical ground reference of said telephone instrument.

9. The circuit as recited in claim 1 wherein said first and second differential input amplifiers are AC coupled to said conductors of said first and second telephone lines.

10. A method of reducing cross-coupled interference between first and second telephone lines of a multi-line telephone instrument, comprising the steps of:

receiving a first signal on said first telephone line into a first differential input amplifier having first tip and ring inputs coupled to conductors of said first telephone line and first tip and ring shunt resistors coupling said first tip and ring inputs to a signal reference of said telephone instrument;

receiving a second signal on said second telephone line into a second differential input amplifier having second tip and ring inputs coupled to conductors of said second telephone line and second tip and ring shunt resistors coupling said second tip and ring inputs to said signal reference; and decreasing a common mode input resistance of said first and second differential input amplifiers with said first and second tip and ring shunt resistors, cross-coupled interference common to both of said first and second telephone lines thereby attenuated.

11. The method as recited in claim 10 further comprising the steps of:

providing resistance between said conductors of said first telephone line and said first differential input amplifier; and providing resistance between said conductors of said second telephone line and said second differential input amplifier, said first and second tip and ring series resistors at least partially compensating for a reduction in differential input resistance of said first and second differential input amplifiers caused by said first and second tip and ring shunt resistors.

12. The method as recited in claim 10 further comprising the steps of:

filtering signals on said first telephone line having a frequency above a first selected threshold frequency; and filtering signals on said second telephone line having a frequency above a second selected threshold frequency.

13. The method as recited in claim 10 wherein said first differential input amplifier comprises a first operational amplifier having first inverted and non-inverted inputs and an output, a first feedback resistor coupling said first output and said first inverted input and said second differential input amplifier comprises a second operational amplifier having second inverted and non-inverted inputs and an output, a second feedback resistor coupling said second output and said second inverted input, said method comprising the step of:

providing feedback to said first and second inverting inputs with said first and second feedback resistors, respectively.

14. The method as recited in claim 13 wherein:

said first differential input amplifier comprises a first operational amplifier having first inverted and non-inverted inputs and an output, a resistor coupling said first non-inverted input to said signal reference; and said second differential input amplifier comprises a second operational amplifier having second inverted and non-inverted inputs and an output, a resistor coupling said second non-inverted input to said electrical reference.

15. The method as recited in claim 10 further comprising the step of coupling said first tip and ring inputs to tip and ring conductors of said first telephone line, respectively.

16. The method as recited in claim 10 wherein said signal reference of said telephone instrument differs from first and second signal references associated with said first and second telephone lines, respectively.

17. A multi-line telephone instrument, comprising:

a base having a keypad and containing circuitry of said telephone instrument;

a handset, coupled to said circuitry, for providing an interface for a user;

a network interface for selectively coupling said telephone instrument to one of first and second telephone lines of a telecommunications network; and a circuit for reducing cross-coupled interference between said first and second telephone lines, comprising:

a first differential input amplifier having first tip and ring inputs coupled to conductors of said first telephone line and first tip and ring shunt resistors coupling said first tip and ring inputs to a signal reference of said telephone instrument; and a second differential input amplifier having second tip and ring inputs coupled to conductors of said second telephone line and second tip and ring shunt resistors coupling said second tip and ring inputs to said signal reference, said first and second tip and ring shunt resistors decreasing a common mode input resistance of said first and second differential input amplifiers, thereby attenuating cross-coupled interference common to both of said first and second telephone lines and deleterious to an operation of said circuitry of said telephone instrument.

18. The instrument as recited in claim 17 wherein:

said first tip and ring inputs comprise first tip and ring series resisters for providing resistance between said conductors of said first telephone line and said first differential input amplifier; and said second tip and ring inputs comprise second tip and ring series resisters for providing resistance between said conductors of said second telephone line and said second differential input amplifier, said first and second tip and ring series resisters at least partially compensating for a reduction in differential input resistance of said first and second differential input amplifiers caused by said first and second tip and ring shunt resisters.

19. The instrument as recited in claim 17 further comprising:

a first capacitor, coupling said first tip and ring inputs, to filter signals on said first telephone line having a frequency above a first selected threshold frequency; and a second capacitor, coupling said second tip and ring inputs, to filter signals on said second telephone line having a frequency above a second selected threshold frequency.

20. The instrument as recited in claim 17 wherein:

said first differential input amplifier comprises a first operational amplifier having first inverted and non-inverted inputs and an output, a first feedback resistor coupling said first output and said first inverted input; and said second differential input amplifier comprises a second operational amplifier having second inverted and non-inverted inputs and an output, a second feedback resistor coupling said second output and said second inverted input.

21. The instrument as recited in claim 20 wherein:

said first differential input amplifier lifter comprises a first operational amplifier having first inverted and non-inverted inputs and an output, a resistor coupling said first non-inverted input to said signal reference; and said second differential input amplifier comprises a second operational amplifier having second inverted and non-inverted inputs and an output, a resistor coupling said second non-inverted input to said signal reference.

22. The instrument as recited in claim 17 wherein said signal reference of said telephone instrument differs from first and second signal references associated with said first and second telephone lines, respectively.

* * * * *